2,958,687

PURIFYING ORGANOMETAL-CATALYZED ISOTACTIC POLY-α-OLEFINS BY HEAT TREATMENT

Kenneth R. Dunham and John Van Den Berghe, Rochester, and Jan W. H. Faber, Hilton, N.Y., assignors to Eastman Kodak Company, Rochester, N. Y., a corporation of New Jersey No Drawing. Filed June 23, 1959, Ser. No. 822,179

9 Claims. (Cl. 260—93.5)

This invention relates to a process for preparing isotactic α-olefin polymers, and more particularly isotactic polystyrene of very high purity and superior physical properties.

In the preparation of polymers from α-olefins a polymerization catalyst is employed comprising certain organometallic materials which are extremely difficult to remove, and consequently the appearance and properties of the polymeric product are adversely affected. This is particularly true with the so-called Ziegler type of catalysts which comprise mixtures of organo-aluminum compounds containing aluminum to hydrocarbon bonds and a halide of a transition metal from Groups IV to VI of Mendeleef's periodic arrangement of the elements ["Handbook of Chemistry & Physics," 23rd edition, pages 344–5, Chemical Rubber Publishing Co., Cleveland, Ohio (1939)], for example, aluminum alkyls and titanium halides. For instance, incompletely purified isotactic polymers, i.e. containing catalyst residues, discolor when heated and give lumpy, inhomogeneous extrusions of very poor tensile strength and elasticity even when the catalyst residue is present in only small amounts. Obviously, such impure products are unsuitable for commercial applications in the fiber- and sheet-making arts.

Various methods have been proposed heretofore to eliminate the catalyst residues from such polymers. For example, conventional methods of separation such as filtration of the viscous dispersions or solutions obtained in the polymerization processes have been found to remove only the relatively larger catalyst particles. Other proposed methods such as leaching with alcohol followed by treating with hydrochloric acid or treating with steam, while eliminating the bulk of the catalyst residues, also have not proven satisfactory because the so treated polymeric products still retain sufficient catalyst residues to limit seriously their commercial uses. Another proposed method which calls for partial coagulation of the polymer solution for the purpose of occluding catalyst residues in a more readily filterable precipitate likewise has not proven entirely efficacious and commercially feasible.

We have now discovered a unique and efficient method for preparing very pure isotactic polymers of α-olefins of the general formula:

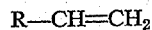

R—CH=CH$_2$ wherein R represents an alkyl group of 1–8 carbon atoms such as methyl, ethyl, propyl, isopropyl, butyl, hexyl, octyl, etc. or an aryl group such as phenyl, tolyl, etc., and more particularly pure isotactic polystyrene and pure isotactic polyisopentene, from said poly-α-olefins containing catalyst residues derived from organo-metallic catalysts of the Ziegler type used in the preparation thereof, which comprises heating a melt of the said impure poly-α-olefin, followed by dissolving the melt in a suitable solvent, filtering the solution while still hot and separating the purified polymer from the filtrate. The purified polymeric product thus obtained may be formed into fibers or films having outstanding physical properties, and biaxially oriented films thereof are particularly useful as film supports for photosensitive layers.

It is, accordingly, an object of the invention to provide a novel method for preparing very pure isotactic poly-α-olefins. Another object is to provide a novel heating-filtering method for removing substantially all of the catalyst residues and other impurities from the crude isotactic polymers. Another object is to provide a novel method for removing Ziegler type of catalyst residues from the above kinds of polymers, and more particularly from impure isotactic polystyrene and isotactic polyisopentene. Other objects will become apparent hereinafter.

In accordance with the invention, we prepare our very pure poly-α-olefins, e.g. very pure isotactic polystyrene, by first heating the impure, catalyst-residue-containing polymer to a melt maintained at from 300°–350° C. for a period of about from 15 minutes to several hours or more, followed by mixing a high boiling aromatic hydrocarbon solvent having a boiling point about from 110°–215° C. such as toluene, xylene, tetralin, decalin, dihydronaphthalene, hexahydronaphthalene, etc., with the melt to form a homogeneous solution, and thereafter removing suspended solids by centrifuging, decanting, etc., but preferably by first adjusting the temperature and filtering the solution one or more times through a filtering material, and then isolating the purified polystyrene by conventional separation means, for example, by pouring the filtrate into a nonsolvent such as for example acetone, methanol, ligroin, etc. Crystallization is effected by boiling in acetone, then in methyl ethyl ketone. Advantageously, the mixture is stirred during the melting and dissolution in the solvent. The concentration of the polymer in the hydrocarbon solvent can vary about from 1–15%, or even more, of solids, preferably about 4–10%. The temperature of the solution to be filtered may be varied over a wide range e.g. as low as 50° C. or as high as 215° C., or even more, but preferably about from 100°–215° C. While the steps of preparing and heating the melt, dissolving the melt and filtering the resulting solution are ordinarily carried out at normal atmospheric pressures, if desired, higher than atmospheric pressures can also be employed, e.g. where the particular solvent is used at temperatures above its normal boiling point. Also, the method can be carried out in continuous manner. It will also be understood that the filtration step may be repeated as many times as desired and that various known filtering materials are efficacious such as felt, paper, inorganic filtering materials, and the like. Various filter aids may also be employed.

The following examples will serve further to illustrate our invention.

EXAMPLE 1

750 ml. of freshly distilled, inhibitor-free styrene and 400 ml. of decalin, which had been dried over metallic sodium and distilled immediately prior to use, were placed in a 2-liter flask equipped with a power driven stirrer, a thermometer to read liquid temperature, a reflux condenser and an electrical heating mantle. There were then added, with stirring, 69 ml. of pure triethyl aluminum and finally, dropwise, 11 ml. of pure titanium tetrachloride. The temperature was allowed to increase to 70° C. and maintained, with stirring, at this temperature by use of external heating or cooling as required for 3 hours. The reaction mixture was then cooled to about 40° C. and poured into a large volume of methanol (or methanol containing hydrochloric acid). Fresh methanol was added, and the polymer mass broken into small pieces, and the polymer then washed with successive changes of methanol and dried. At this point, the polymer still retains catalyst residues in amounts precluding use thereof for commercial fiber- and film-making purposes.

In place of the styrene in the above example, there may be substituted an equivalent amount of a monomeric aliphatic α-olefin such as propylene, pentene, isopentene, hexene, decene etc. to give a generally similar polymeric product adversely affected in appearance and physical properties primarily because of the presence therein of the catalyst residues.

EXAMPLE 2

Isotactic polystyrene prepared according to Example 1 using triethyl aluminum-titanium tetrachloride catalyst was placed in a round bottom flask and immersed in an oil bath at 325° C. for 2 hours. The molten mass was stirred very slowly by means of a stainless-steel stirrer. A high boiling solvent, such as toluene, xylene, tetralin, or decalin, was then added in sufficient volume to form a solution having 5 percent solids concentration. The solution was filtered through washed felt, then through filter paper and a filter aid. The filtered solution was poured into a large volume of anhydrous methanol and the polymer filtered. Crystallization was effected by boiling the polymer in acetone, then in methyl ethyl ketone. The polymer was then dried under vacuum at 50° C. Yield=70 percent. The product had an inherent viscosity of 1.04. A melt was prepared and extruded to a clear, bubble-free, oriented monofilament having the following physical properties:

Young's Modulus=9.1 kg./cm.$^2$ x 10$^{-4}$
Tensile=1730 kg./cm.$^2$
Yield=1200 kg./cm.$^2$
Elongation at break=26 percent
Heat distortion temperature=>200° C.

The following table compares some of the physical properties of the above described filaments with monofilaments prepared from a representative commercial type of oriented atactic polystyrene.

Table

MECHANICAL PROPERTIES OF ORIENTED POLYSTYRENES

| Sample | Young's Modulus ×10$^{-4}$ kg./cm.$^2$ | Tensile Strength, kg./cm.$^2$ | Elongation at Break (Percent) | Heat Distortion Temperature |
|---|---|---|---|---|
| Monofil, Commercial, atactic, stretched 210% at 110° C | 3.4 | 810 | <4 | 100° C. |
| Monofil, Example 2, isotactic, stretched 300% at 102° C | 9.1 | 1,730 | 26 | >200° C. |
| Sheet, Plax PB* | 3.5 | 810 | 3.6 | 100° C. |

*This is a commercially available oriented atactic polystyrene sheeting material manufactured by the Plax Corporation.

By reference to the above table, it will be seen that the monofilaments prepared with the isotactic polystyrene produced according to the heating-filtering purification process of Example 2 of the invention show approximately 100% higher modulus, tensile strength and heat distortion temperature, and approximately six times the elongation at the break point, than is shown by the commercial specimens of atactic polystyrene. No comparison data with the crude isotactic polystyrene of Example 1 are included because of the inability to obtain anything but bubbly, brittle monofilaments and films therefrom. Accordingly, the data of the table indicate that isotactic polystyrene prepared in accordance with the heating-filtering process of Example 2 of the invention are outstanding materials for fiber- and film-forming purposes.

EXAMPLE 3

Polyisopentene prepared according to the general procedure of Example 1, using the catalyst triethyl aluminum-titanium tetrachloride, was placed in a large test tube and immersed in an oil bath at 325° C. for 30 minutes. The mass was stirred during this period by means of a stainless-steel stirrer. The molten mass was then dissolved in tetralin to form a solution with 5 percent solids content. Previous to the heat treatment, the polymer was insoluble in boiling tetralin. The solution was filtered and poured into acetone. The polymer was filtered, then boiled successively in acetone, ether, and n-heptane. The residue was dried under vacuum at 50° C. The same starting polyisopentene when purified according to the process of Belgian Patent 546,216, Example 1, wherein the polymer is reduced to a fine powder and treated several times with acetone and very hot hydrochloric acid, was found to be insoluble in solvents even at the boiling points.

Although the preceding description and examples have been concerned primarily with monofilaments of outstanding properties, it will be understood that the purified poly-α-olefins of the invention as represented by above Examples 2 and 3 are also highly useful for the preparation of biaxially oriented films of generally similar greatly improved physical properties. For example, such biaxially oriented films having improved properties have been coated with light-sensitive layers, for example, a gelatino-silver halide emulsion layer, or a light-sensitive synthetic polymer layer that becomes insoluble on exposure to light, and the elements so produced exposed and developed to images. In one example, the light-sensitive system was a silver halide emulsion layer, in another example it was a gelatin-bichromate layer, while in still another example the light-sensitive layer comprised a photosensitive polymeric stilbazole such as described in G. W. Leubner et al., U. S. Patent 2,811,510, dated October 29, 1957. Other applications of the high purity, isotactic polystyrene of the invention include uses as moistureproof packaging materials, as backings for other more conventional film supports such as polyethylene terephthalate, cellulose esters, etc., as material of high dielectric constant for electric motors, and the like. If desired, modifying materials such as fillers, dyes, pigments, lubricants, softeners, etc. can be incorporated in the polystyrene melts for the extrusion and molding of various shaped articles.

The invention has been described in detail with particular reference to preferred embodiments thereof, but it will be understood that variations and modifications can be effected within the spirit and scope of the invention as described hereinabove and as defined in the appended claims.

What we claim is:

1. A process for purifying a poly-α-olefin of a compound represented by the following general formula:

R—CH=CH$_2$ wherein R represents a member selected from the group consisting of an alkyl group of from 1–8 carbon atoms, a phenyl group and a tolyl group, the said poly-α-olefin containing catalyst residues derived from a catalyst comprising an organo-aluminum compound having aluminum to hydrocarbon bonds and a halide of a transition metal of Groups IV to VI of Mendeleef's periodic arrangement of the elements, said catalyst having been used in the preparation of the said poly-α-olefin, which comprises the steps (1) heating the said poly-α-olefin to a melt maintained at a temperature of from 300°–350° C. for a period of 15 minutes to 3 hours, (2) dissolving the said melt in an aromatic hydrocarbon solvent having a boiling point about from 110°–215° C. and (3) filtering the resultant solution in a heated condition.

2. The process of claim 1 wherein the purified polymer is separated from the said filtered solution.

3. The process of claim 1 wherein the said catalyst residues are derived from a catalyst comprising a trialkyl aluminum and a halide of a transition metal of Groups IV to VI of Mendeleef's periodic arrangement of the elements.

4. A process for purifying an isotactic polystyrene containing catalyst residues derived from a triethylaluminum and titanium tetrachloride mixed catalyst used in the preparation of the said polystyrene, which comprises the steps (1) heating the said polystyrene to a melt maintained at 325° C. for 2 hours, (2) dissolving the said melt in decalin and (3) filtering the resultant solution in a heated condition.

5. The process of claim 4 wherein the purified polystyrene is separated as a precipitate from the said filtered solution by mixing the said solution with methanol.

6. The process of claim 4 wherein the said melt is dissolved in said decalin in an amount sufficient to form a 5% solution thereof.

7. A process for purifying an isotactic polyisopentene containing catalyst residues derived from a triethylaluminum and titanium tetrachloride mixed catalyst used in the preparation of the said polyisopentene, which comprises the steps (1) heating the said polyisopentene to a melt maintained at 325° C. for 30 minutes, (2) dissolving the said melt in decalin and (3) filtering the resultant solution in a heated condition.

8. The process of claim 7 wherein the purified polyisopentene is separated as a precipitate from the said filtered solution by mixing the said solution with methanol.

9. The process of claim 7 wherein the said melt is dissolved in said decalin in an amount sufficient to form a 5% solution thereof.

No references cited.